United States Patent
Tamez, Jr.

(10) Patent No.: US 7,640,884 B2
(45) Date of Patent: Jan. 5, 2010

(54) FIREHOSE COUPLING EXIT INDICATOR

(76) Inventor: Isidro Tamez, Jr., 7410 Ilex, Houston, TX (US) 77012

( * ) Notice: Subject to any disclaimer, the term of this patent is extended or adjusted under 35 U.S.C. 154(b) by 117 days.

(21) Appl. No.: 11/938,200

(22) Filed: Nov. 9, 2007

(65) Prior Publication Data

US 2009/0120350 A1    May 14, 2009

(51) Int. Cl.
*G01D 21/00* (2006.01)
*F16L 19/00* (2006.01)

(52) U.S. Cl. .............................. 116/205; 116/DIG. 17

(58) Field of Classification Search ............... 116/205, 116/DIG. 17; 285/354, 93; 40/316, 631
See application file for complete search history.

(56) References Cited

U.S. PATENT DOCUMENTS

| | | | |
|---|---|---|---|
| 1,198,476 A | 9/1916 | Pearson | |
| 1,225,616 A | 5/1917 | Gough | |
| 1,966,718 A | 1/1934 | Hanson | |
| 1,978,245 A | 10/1934 | Barker | |
| 2,029,798 A | 2/1936 | Schellin | |
| 2,341,583 A | 2/1944 | Tuve | |
| 2,491,699 A | 12/1949 | Wing | |
| 2,513,621 A | 7/1950 | Boice | |
| 2,787,975 A | 4/1957 | Dunn | |
| 3,104,816 A | 9/1963 | Jaffe | |
| 4,401,050 A | 8/1983 | Britt et al. | |
| 4,592,575 A | 6/1986 | Hughes et al. | |
| 4,844,000 A | 7/1989 | Clement | |
| 4,884,990 A | 12/1989 | Lovik | |
| D312,390 S | 11/1990 | Clement | |
| 5,027,741 A | 7/1991 | Smith | |
| 5,138,784 A * | 8/1992 | Niwa | 40/665 |
| D333,779 S * | 3/1993 | Clement | D10/109 |
| D345,519 S | 3/1994 | Clement | |
| 5,363,576 A * | 11/1994 | Piana et al. | 40/316 |
| 5,402,592 A * | 4/1995 | Caveney et al. | 40/665 |
| D374,408 S | 10/1996 | McMillan | |
| 5,623,890 A | 4/1997 | Lenske | |
| D382,501 S * | 8/1997 | Clement | D10/109 |
| 5,697,652 A | 12/1997 | Nishikawa | |
| 5,988,101 A * | 11/1999 | Jacobs et al. | 116/205 |
| 6,074,739 A | 6/2000 | Katagiri | |
| 6,079,135 A * | 6/2000 | Ruiz | 40/316 |
| 6,499,421 B1 | 12/2002 | Honigsbaum | |
| 6,504,103 B1 | 1/2003 | Meyer et al. | |
| 6,766,761 B1 | 7/2004 | Tamez, Jr. et al. | |
| 2004/0248483 A1 | 12/2004 | Bolta | |

(Continued)

FOREIGN PATENT DOCUMENTS

JP       2002139182 A  *  5/2002

(Continued)

OTHER PUBLICATIONS

Office Action dated Oct. 14, 2008 issued in U.S. Appl. No. 11/230,707.

(Continued)

*Primary Examiner*—R. A. Smith
(74) *Attorney, Agent, or Firm*—Gary L. Bush; Mark D. Shelley, II; Andrews Kurth LLP (57) ABSTRACT

A direction indicator device captured between couplers of ends of firehose sections that point to the source of the firehose and to safety. The direction indicator device includes a gasket-like annular body which fits over the male threads of the male coupler and is captured between annular ends of the abutting male and female coupler bodies. Direction pointing fingers, integral with the annular body, point toward the hose section to which the male coupler is attached and are angularly oriented to fit between longitudinal lugs of the male coupler. A lip is provided on an inwardly facing surface at each finger tip to hinder removal and to prevent inadvertent removal of the device from the male coupler body.

20 Claims, 5 Drawing Sheets

U.S. PATENT DOCUMENTS

2005/0015963 A1    1/2005    Costa et al.
2007/0063512 A1    3/2007    Tamez, Jr.
2009/0188138 A1*    7/2009    Murphy ........................ 40/316

FOREIGN PATENT DOCUMENTS

JP        2004132443 A   *   4/2004
KR      2001097492 A   *   11/2004

OTHER PUBLICATIONS

Response dated Mar. 16, 2009 to Office Action Dated Oct. 14, 2008 in U.S. Appl. No. 11/230,707.

Final Office Action dated Apr. 27, 2009 issued in U.S. Appl. No. 11/230,707.

\* cited by examiner

FIREHOSE COUPLING EXIT INDICATOR

BACKGROUND OF THE INVENTION

1. Field of the Invention

This invention relates generally to direction indicators associated with a firehose to assist a firefighter in safe egress from a smoke-filled building using the firehose.

2. Background Art

A primary concern of fire fighting personnel is that of becoming lost in a burning or smoke-filled structure where the firefighter does not know the direction to the outside. Firefighters are commonly taught to follow the firehose lines, knowing that the firehose connects from an outside source of water to the water spraying nozzle. However, under the stresses and pressures of a fire emergency, a firefighter may lose his/her sense of direction, and upon finding a firehose may be unable to conclude which direction leads to the outside water source and which direction leads to the nozzle. As explained in U.S. Pat. No. 4,844,000, innumerable other problems can arise which further minimize the chances of a safe escape.

U.S. Pat. No. 4,844,000, issued Jul. 4, 1989 to Clement, describes a flexible band or clamp with directional fingers protruding perpendicularly from the band. The band is attached to the firehose and helps indicate the direction to the water source of the firehose. The clamp of the '000 patent allows a firefighter to feel along the firehose and determine the direction to the exit. The clamp is a flexible removable band which must be retrofitted along the length of the firehose. The embodiments described include a steel spring clamp capable of being slipped over an unrolled firehose and a flexible band with fastener which encircles the firehose and may remain on a stored firehose. U.S. Des. Pat. No. 312,390 issued Nov. 7, 1990 and U.S. Des. Pat. No. 345,519 issued Mar. 29, 1994, both to Clement, show various embodiments of the directional bands as essentially described in Clement's '000 patent.

Problems are inherent in a device which must be attached by encircling a firehose. Such a device must be able to withstand heat, withstand sudden expansion or change in shape caused by the high water pressure through a firehose, withstand abuse to its surface when being dragged over rough surfaces, and avoid snagging objects and hampering movement of the firehose. Yet, simultaneously, the device must also be able to remain sufficiently flexible to allow the firehouse to be stored in a flattened coil or roll, avoid restriction of water flow by kinking a firehose, and more importantly, withstand being dislodged or removed through abuse of the hose so that the device is there when the firefighter needs it.

U.S. Pat. No. 5,027,741, issued Jul. 2, 1991 to Smith et al., addresses many of these problems in two embodiments of an emergency escape firehose. The '741 embodiments incorporate stiff bristles permanently interwoven at an angle into the canvas surface of a firehose. In the first embodiment, the bristles' angle points towards the water connection source of the firehose thereby enabling a firefighter to feel a smooth surface in that direction and a resistant surface in the opposite direction towards the nozzle connection. In the second embodiment, the bristle angles are reversely inclined and the firefighter must know that the direction towards the resistant feel of the firehose will lead him to the water source connection.

However, when a firefighter is faced with an extreme emergency or panic circumstance, a safety escape device should also be intuitive to use so as to minimize the need for use of cognitive skills. A rookie firefighter trying to remember whether the rough direction is to the nozzle (i.e., the fire) or to the water source has no intuitive clues whether "smooth" is out or "rough" is out. In contrast, a pointer or directional arrow provides intuitive understanding.

The third and fourth embodiments of the '741 patent include a series of annular members attached to the outer surface of the firehose wherein the annular member is inclined to indicate direction. A fifth and sixth embodiment include application of a luminous tapered stripe to the firehose. While these embodiments are more intuitive, they too have the same problems and disadvantages as previously noted.

U.S. Pat. No. 5,623,890 describes a firehose coupling comprising male and female components which thread together to connect firehose sections. The male coupling component always indicates the direction of water flow. The '890 patent discloses an elongated extension integrally attached to each lug of a male component of a firehose coupling. Such lugs are costly to manufacture and require large capital expenditures to provide new coupling sets to equip many firehoses for a large city fire department.

U.S. Pat. No. 6,766,761, incorporated herein by reference, addresses many shortcomings with a firehose coupling exit indicator which is secured between the male and female hose coupler ends. The indicator includes a plastic ring which fits between and is captured by the mated male and female coupler hose ends which has integral triangular fingers that extend from the ring along the outer surface of the male hose coupler end. The triangular fingers act as arrows which point the way to the firehose source and building exit to aid the firefighter in egress.

U.S. Patent Application Publication U.S. 2007/0063512A1, incorporated herein by reference, addresses additional safety features which further increase the effectiveness and sturdiness of the fire hose coupling indicator of the '761 patent.

3. Identification of Objects of the Invention

An object of the invention is to accomplish one or more of the following:

Provide a direction indicating device at the coupling between firehose sections that is inexpensive to manufacture, yet provides a reliable indicator toward the hose source for a firefighter in a dark, smoke-filled building;

Provide an inexpensive direction indicating device that can be attached to couplings of existing firehoses so that entire new couplings need not be purchased;

Provide a direction indicating device at the coupling between firehose sections that provides a reliable tactile indicator of the firehose source direction for a firefighter wearing the thick gloves of a firefighting ensemble in a dark, smoke-filled building;

Provide a direction indicating device at the coupling between firehose sections that provides a reliable visual indicator toward the hose source for a firefighter in a dark, smoke-filled building;

Provide a direction indicating device at the coupling between firehose sections that is arranged and designed to prevent foreign objects or debris from becoming entangled with the device; and Provide a direction indicating device at the coupling between firehose sections that is arranged and designed to prevent the unintended removal of the device while connecting and disconnecting the coupling.

Other objects, features, and advantages of the invention will be apparent to one skilled in the art from the following specifications and drawings.

SUMMARY OF THE INVENTION

The objects identified above, along with other advantages and features, are preferably embodied in an annular direction indicating device which fits over the male threads of a male coupling of a firehose. The direction indicating device has integral indicating fingers which point backward from the coupling toward the hose source. Such fingers fit in the gaps of the lugs of the male coupling. The fingers preferably are shaped like arrowheads and have deep arrow-shaped relief grooves or raised ridges on the outer faces so that a firefighter can easily determine by feel the direction to which they are pointing. The fingers of the device may increase in thickness toward the pointed end and may extend longitudinally well beyond the male hose coupler end to provide a further tactile indicator of the direction toward the firehose source. The device also preferably has a lip or rim on the inwardly facing surface of each finger positioned at or near the tip, which prevents the device from being unintentionally removed from the male coupling while connecting or disconnecting the male and female couplings. Alternatively, or additionally, the fingers may be sloped or curved inwardly toward the male coupling and/or firehose section such that the fingers of the device must be spread apart from each other in order to remove the device from the male coupling. Inwardly sloped or curved fingers, especially at their pointed ends or tips, also assist in preventing the fingers from becoming entangled with foreign objects or debris during firehose use. The direction indicating device is preferably made of a strong engineering thermoplastic, polycarbonate, and/or rubber material which includes luminescent, phosphorescent, fluorescent and/or reflective particles therein for enhanced visual indication of the direction towards safety. The raised or recessed arrowhead-shaped indicia may have a coating which is in sharp contrast to the outward-facing surfaces of the fingers for additional visual recognition.

BRIEF DESCRIPTION OF THE DRAWINGS

The objects, advantages, and features of the invention will become more apparent by reference to the drawings which are appended hereto, and wherein by way of illustration and not limitation embodiments of the invention are described, of which.

DETAILED DESCRIPTION OF THE PREFERRED EMBODIMENTS OF THE INVENTION

Figure 1:
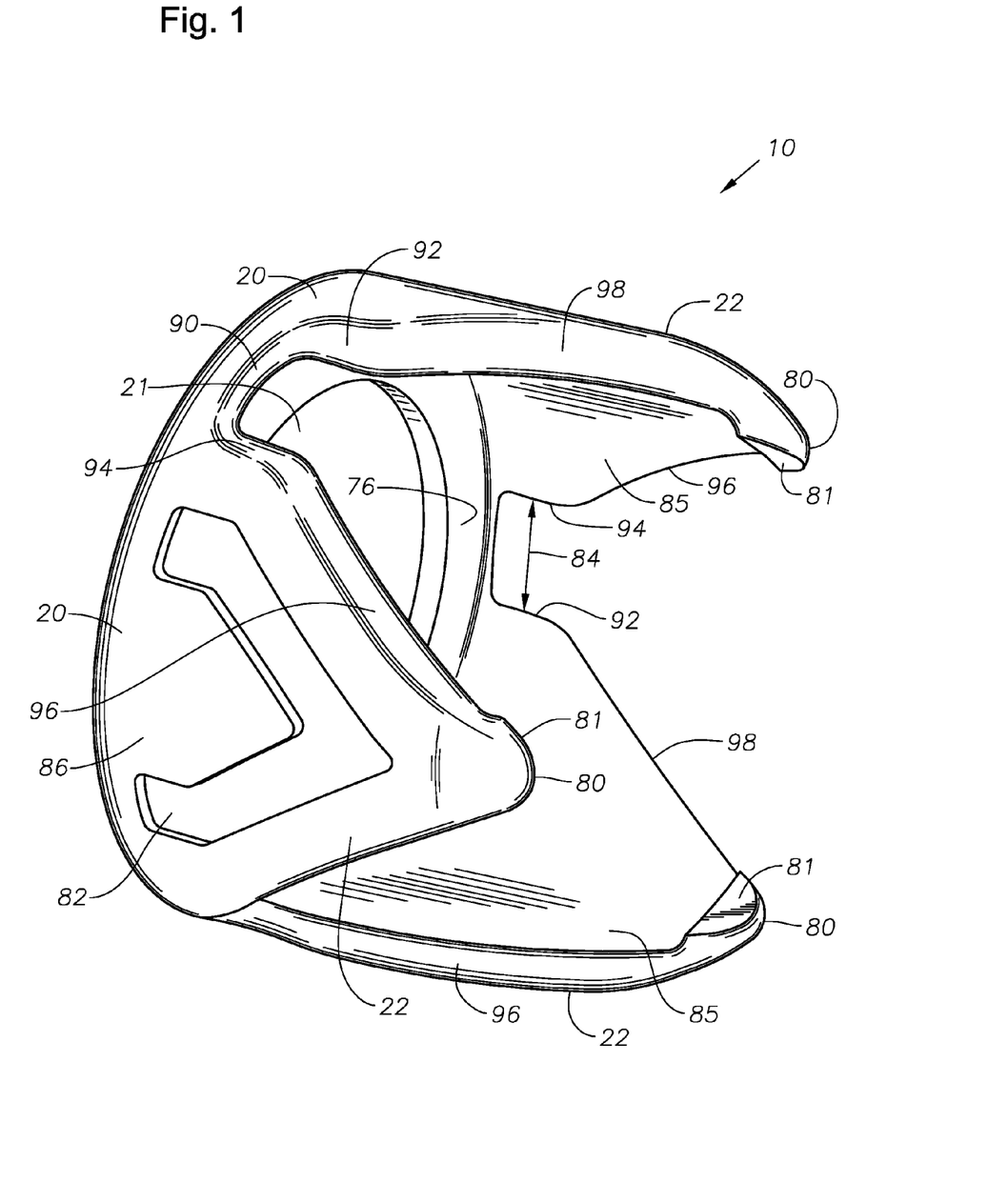
FIG. 1 is a front perspective view of the indicator device according to one implementation of the invention showing an annular ring with integral arrowhead-shaped fingers and arrowhead-shaped relief groove indicia thereon for covering a male firehose coupler.
Figure 2:
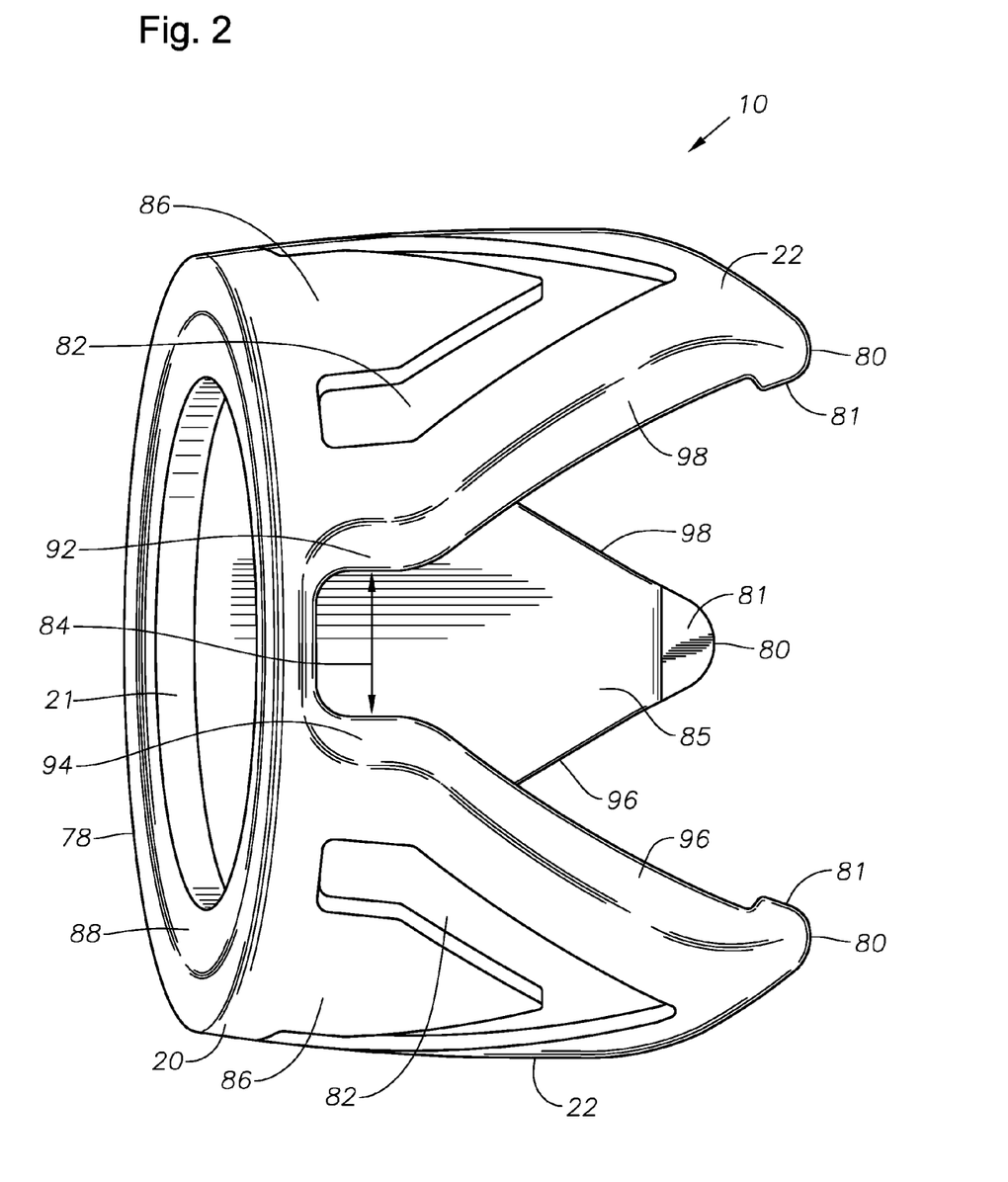
FIG. 2 is a rear perspective view of the indicator device of FIG. 1 showing a recess for accommodating the shoulder of a female firehose coupler and the arrowhead-shaped fingers with arrow-shaped relief groove indicia thereon.

FIGS. 1 and 2 illustrate the firehose direction indicating device 10 according to a preferred implementation of the invention. The indicating device 10 includes a generally planar annular body 20 with aperture 21. Referring to FIG. 1, the annular body has a first face 76 from which a plurality of arrowhead-shaped circumferential fingers 22 extend perpendicularly in a common direction from the plane of body 20. FIGS. 1 and 2 show three fingers 22, but a different number of fingers may be suitable. Preferably, fingers 22 are integral with body 20 and are circumferentially spaced about body 20 so as to define an equal number of narrow slots 84.

Ideally, each finger 22 has an irregular pentagon shape defined by a first, base edge 90 (formed by a circumferential portion of body 20), second and third side edges 92, 94 which extend perpendicularly to the plane of body 20, and fourth and fifth edges 96, 98 which close the pentagon and generally form an arrowhead shape. The tips 80 of fingers 22 (defined by the apex portion of the fourth and fifth edges 96, 98), and other vertices, may be slightly rounded if desired. Furthermore, the fingers 22 may be thicker at the tip 80 than they are near body 20.

As shown in FIG. 1, the fingers 22 each have an inner lip or rim 81 positioned at or near tips 80. The inner lip or rim 81 projects inwardly from the inwardly facing surface 85 of fingers 22 toward the coupling system (FIGS. 3-6). The inner lip 81 may be formed from a separate structure that is connected to the inwardly facing surface 85 of finger 22 or the inner lip 81 may be integrally formed from the finger 22 itself, such as by notching the inwardly facing surface 85 of finger 22 to create an inwardly projecting structure of finger 22 at or near tip 80.

Referring to FIG. 2, annular body 20 has an obverse face 78 opposite to the first face 76 (FIG. 1). The obverse face preferably includes a circular recess 88 centered in annular body 20 which accommodates the annular shoulder 38 (FIG. 3) of female coupler 36 (FIGS. 3-6) and allows for hand or spanner wrench tightening to prevent water leaks at the coupler connection.

Referring to FIGS. 1 and 2, each finger 22 preferably includes an indicium 82 on its outward-facing surface 86. The indicia 82 are ideally shaped to resemble an arrowhead pointing in the same direction as the arrowhead-shaped fingers 22. Each indicium 82 is preferably a recess formed by a wide and deep groove so that its direction can be readily identified even by a firefighter wearing the thick gloves of a firefighting ensemble. Alternatively, the indicia 82 may be raised above (not illustrated) the outward-facing surfaces 86 of fingers 22 in such a manner as to promote identification of the arrowhead direction by a firefighter.

Figure 3:
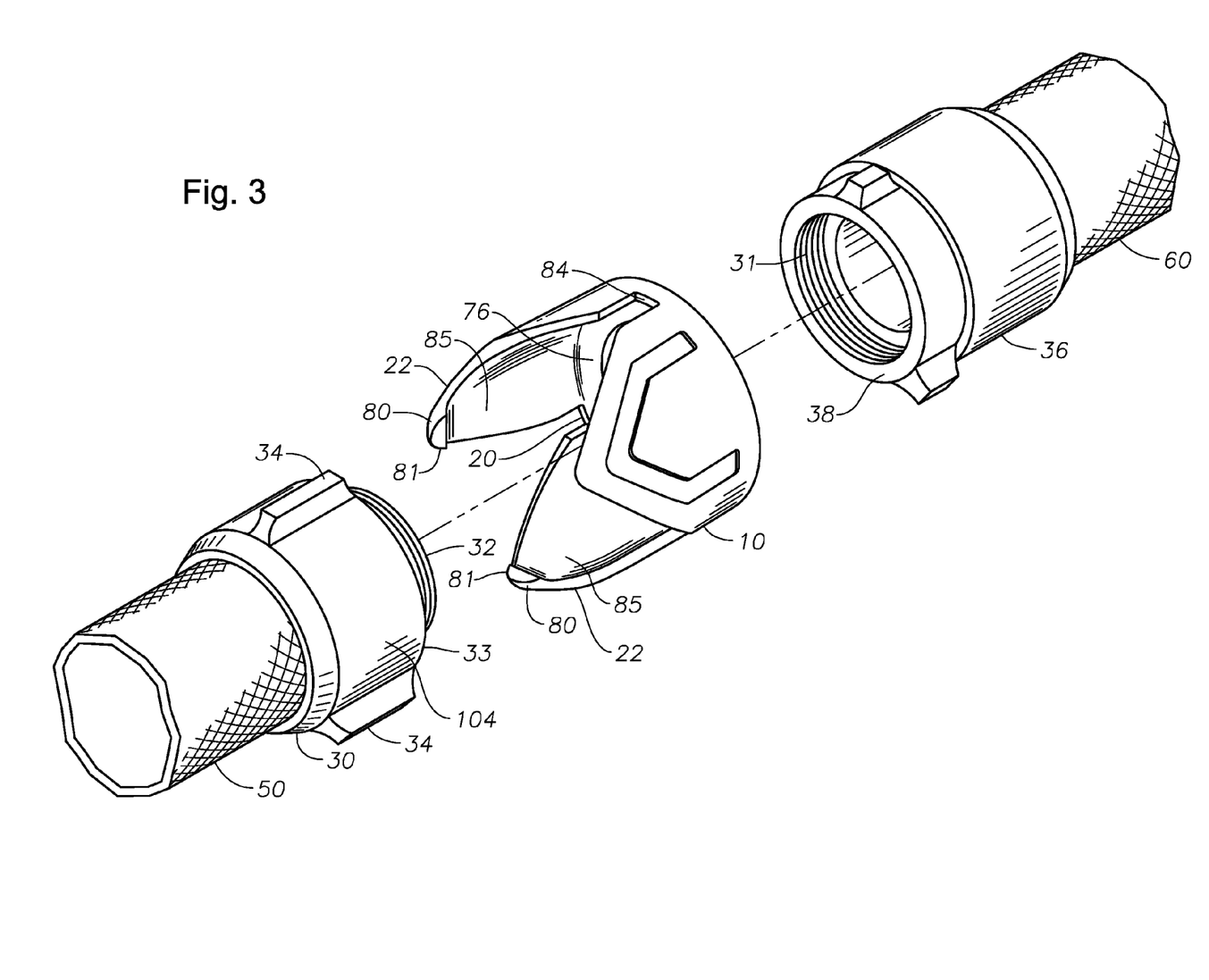
FIG. 3 is a perspective explosion diagram of the indicator device FIGS. 1 and 2 placed between male and female firehose coupler ends showing the indicator device fingers which circumscribe the male coupler end of a firefighting hose section to indicate the direction of the firehose source.
Figure 4:
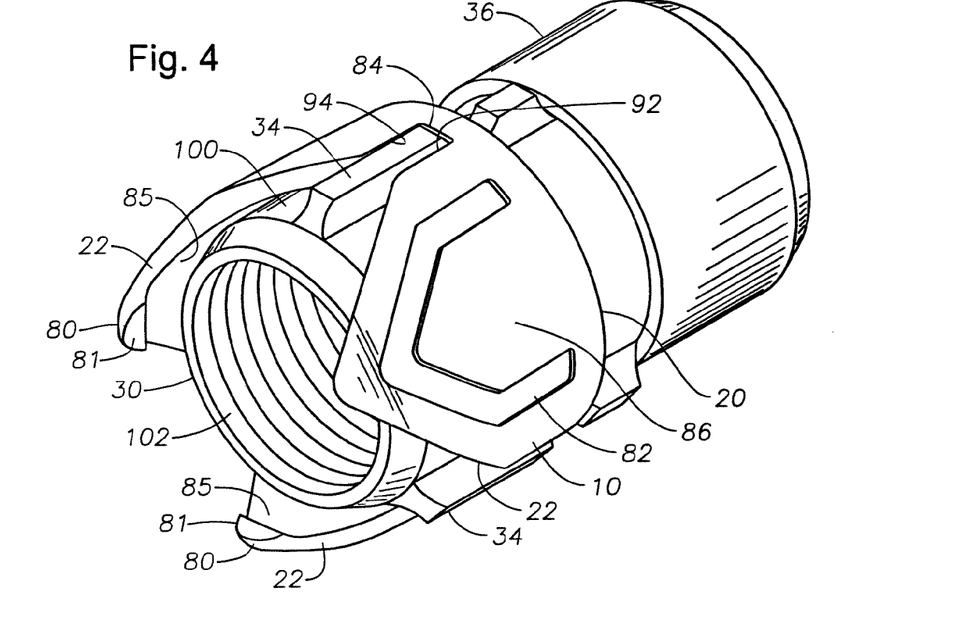
FIG. 4 is a perspective view of an assembled firehose coupling of FIG. 3 showing the indicator device of FIGS. 1 and 2 captured between the male and female coupler sections, wherein for clarity, the firehose sections are not shown.
Figure 5:
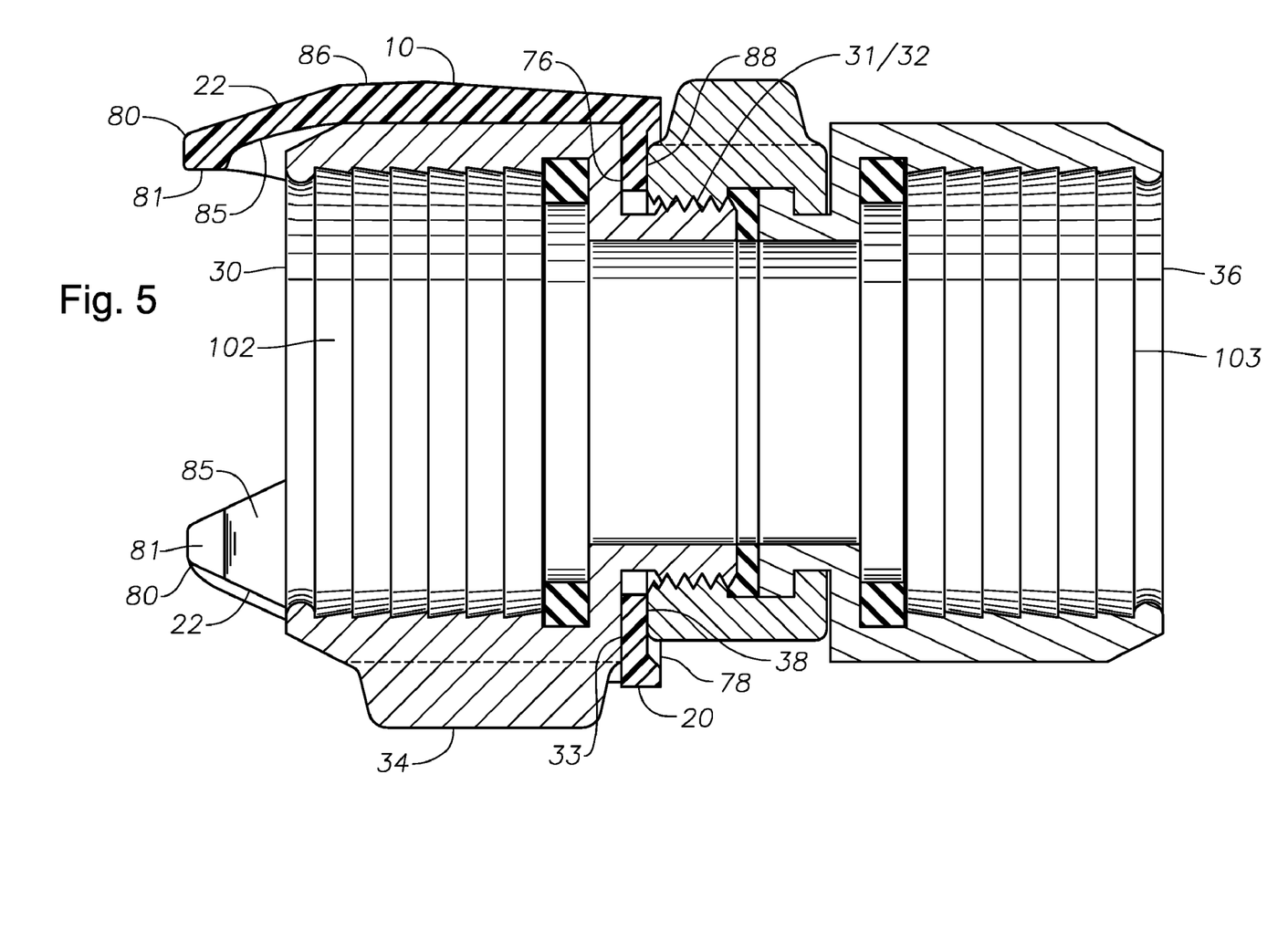
FIG. 5 is a longitudinal cross section of the assembled firehose coupling of FIG. 4 showing the indicator device of FIGS. 1 and 2 captured between the male and female coupler sections.

FIGS. 3 through 5 illustrate how the direction indicating device 10 of FIGS. 1 and 2 is used in conjunction with a firehose coupling assembly. As shown in FIG. 3, the body 20 is like a gasket in that it extends over the end of male coupler 30 at the end of a hose section 50 with aperture 21 receiving the male threads 32. The first face 76 of body 20 abuts the annular shoulder 33 of male coupler 30. The direction-indicating fingers 22 are spaced about body 20 so as to fit between and partially abut lugs 34 of male coupler 30, covering a portion of the interposal coupler surfaces 104 (FIG. 3) (defined between two adjacent lugs 34). In other words, the lugs 34 of male coupler 30 are received into fitted slots 84. Three lugs 34 are common for firehouse couplers, so three direction indicating fingers are provided for such couplers, but four fingers are provided for couplers with four lugs, etc. Preferably, arrowhead fingers 22 have increasing thickness toward their tips 80, but the thickness is arranged so that the arrowhead fingers 22 do not extend radially beyond the radial extent of the coupling lugs, so that the fingers will be protected from damage during use.

The inner lip or rim 81 of fingers 22 allows the direction indicating device 10 to come into contact with the male coupling 30 or hose section 50 during coupling connection and disconnection, thereby preventing or hindering the device 10 from slipping off or otherwise becoming unintentionally removed. Additionally, or alternatively, the fingers 22 may extend from first face 76 at an acute angle, or in other words, the fingers may slope or curve inwardly toward the male coupler 30 or coupling system when the direction indicating device 10 is positioned thereon (i.e., the fingers 22 may have an acute angular slope toward each other), such that the fingers 22 of the device 10 must be spread apart from each other in order to remove the device 10 from the coupling system.

As shown in FIG. 3, coupled hose sections 50, 60 are selectively connected to each other by male and female threaded couplers 30, 36. The annular body 20 of indicating device 10 is captured between annular shoulders 33, 38 of couplers 30, 36 when the female threads 31 of coupler 36 are threaded onto the male threads 32 of coupler 30. The integral fingers 22 fit between lugs 34 of the male coupler 30 and point toward the firehose water source (i.e., the fire plug) and away from the end of the hose where a nozzle is typically provided and carried to the fire inside a building.

FIG. 4 illustrates the firehouse coupling assembly with direction indicator device 10 of FIGS. 1 and 2 when the female coupler 36 is threaded about the male coupler 30. For clarity, the firehose sections 50 and 60 are not illustrated, and the internal serrated barbed surface 102 of male coupler 30 which captures the fabric firehose is visible. As illustrated in FIG. 4, it is desirable for fingers 22 to cover the entire circumferential portion of male couple body 30 near body 20, or as much as possible, to provide structural strength. By positioning lugs 34 between finger sides 92, 94, or in other words, by providing fitted slots 84 to receive lugs 34, the finger-body interface is made stronger by having fingers of longer length and of greater amount of radial curvature; thus, fingers 22 are less likely to break apart from body 20 if they snag on an object as the firehose is being dragged. Fingers 22 also preferably have an increased thickness for strength and rigidity. Therefore, the depth of the slots 84 is ideally short enough to allow clearance for spanner wrenches to easily engage lugs 34. In other words, side edges 92, 94 are designed to be long enough to provide finger strength, but short enough to provide spanner wrench clearance space 100 around each lug 34. As shown in FIG. 4, inwardly sloping or curved fingers 22, especially near their pointed edges or tips 80, assist in preventing the fingers 22, and the device 10 itself, from becoming entangled with foreign objects or debris during firehose use.

FIG. 5 illustrates the assembled firehose coupling of FIG. 4 showing the indicator device 10 of FIGS. 1 and 2 captured between the male and female coupler sections. As shown in FIG. 5, the thickness of annular body 20 between the first and obverse faces 76, 78 along the perimeter radially outward of recess 88 is great enough to provide overall strength and rigidity. However, recess 88 is provided on the obverse face 78 of body 20 to accommodate female coupler 36 by receiving its shoulder 38. Recess 88 allows for complete engagement of threads 31, 32 either by hand or spanner wrench thereby preventing water leaks at the coupler connection. FIG. 5 also illustrates the serrated barbed inner surface 103 of female coupler 36 which captures the fabric firehose.

With the direction indicating device 10 of FIGS. 1 and 2 supplied at each hose section coupling, a firefighter in a dark smoke-filled burning building can find a firehose and feel for the couplings, and upon feeling or seeing the arrowhead-like fingers 22 between lugs 34 or the arrowhead-like indicia 82 on the outward-facing surface 86 of the fingers 22, immediately know the direction to the firehose water source and away from the nozzle of the hose. Furthermore, because the tips 80 of fingers 22 may extend well beyond the generally cylindrical body of male coupler 30, even a firefighter wearing the densest and/or thickest gloves can detect their presence beyond the coupling to determine the direction to safety.

Figure 6:
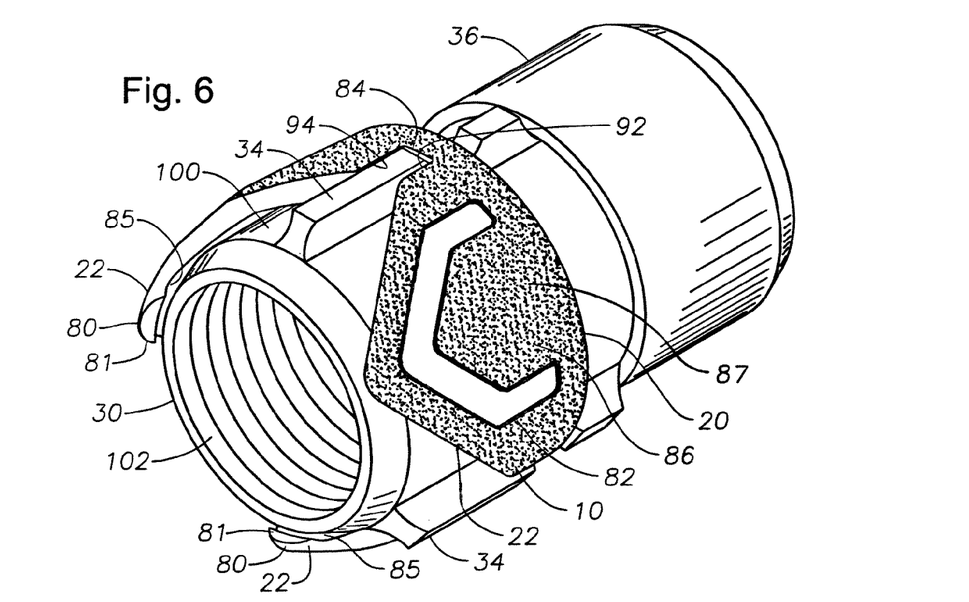
FIG. 6 is a perspective view of an assembled firehose coupling having an alternative implementation of the indicator device according to the invention assembled therewith showing a rough textured outward facing surface and raised arrowhead-shaped indicia thereon.

FIG. 6 illustrates several alternative implementations of the invention. While the tips 80 of direction indicating device 10 preferably extend longitudinally past the male coupler 30 body for ready tactile identification as shown in FIG. 4, the tips 80 may be arranged and designed to not extend longitudinally past the male coupler 30 body as shown in FIG. 6. The arrowhead-shaped indicia 82 may also be raised above the outward facing surface 86 as shown in FIG. 6 rather than being formed by a recessed groove as illustrated in FIG. 4. The outward facing surface 86 may be molded to form a texture 87 for improved tactile recognition, or alternatively, texture 87 may be formed by applying rough coating to or by machining or knurling the outward facing surface 86.

The direction indicating device 10 described and illustrated herein can be manufactured relatively inexpensively by injection molding techniques using a suitable plastic or rubber material. Strong engineering thermoplastics such as polysulfone, acetal, polycarbonate, and polyetheretherketone may be particularly desirable, because they have excellent strength, impact and abrasion resistance, and high temperature stability.

Although the plastic or rubber material can be of bright colors such as yellow or orange to help the firefighters see the arrowhead fingers in limited light, the plastic may also include phosphorescent, fluorescent, and/or reflective particles therein for enhanced visual identification. More preferably still, the plastic includes luminescent material therein so that indicator 10 glows in the dark. Alternatively, a luminescent, phosphorescent, fluorescent, and/or reflective coating may be applied to the indicator 10, or a portion thereof. For example, indicator 10 may be manufactured of a luminescent glow-in-the-dark plastic material, while indicia grooves 82 may be coated with a contrasting, fluorescent and reflective material, including reflective tape, to stand out clearly from the luminescent outward-facing finger surfaces 86. Preferably, indicia 82 will be in contrast to the outward-facing finger surfaces 86 in both light and dark conditions.

The Abstract of the disclosure is written solely for providing the United States Patent and Trademark Office and the public at large with a means by which to determine quickly from a cursory inspection the nature and gist of the technical disclosure, and it represents one implementation of the invention and is not indicative of the nature of the invention as a whole.

While some embodiments of the invention have been illustrated in detail, the invention is not limited to the embodiments shown; modifications and adaptations of the above embodiment may occur to those skilled in the art. Such modifications and adaptations are in the spirit and scope of the invention as set forth herein:

The invention claimed is:

1. A directional indicator (10) for a firehose coupling system, the coupling system including a male coupler (30) with male threads (32) secured to a first section (50) of firehose, said male coupler having a generally cylindrical body with an annular shoulder (33) from which said male threads (32) extend outwardly and a plurality of raised longitudinal lugs (34) which define interposed coupler surfaces (104) between said lugs on said cylindrical body, said system including a female coupler (36) with female threads (31) secured to a second section (60) of firehose, said female coupler having a generally cylindrical body with an annular shoulder (38) from which said female threads extend inwardly, said female threads arranged and designed for securement to said male threads of said male coupler, the directional indicator (10) comprising, a generally planar annular body (20) defining a plane and having a first face (76) which is arranged and designed to abut said annular shoulder (33) of said male coupler (30) and a second obverse face (78) which is arranged and designed to abut said annular shoulder (38) of said female coupler, and a plurality of curved fingers (22) which are integral with said annular body with each of said fingers (22) extending from said first face generally perpendicular to said plane of said annular body, each of said fingers (22) being arranged and designed for interjacent placement between two lugs (34) of said male coupler (30) circumjacent one of said interposed coupler surfaces (104) and extending longitudinally along said generally cylindrical body of said male coupler in a direction opposite the male threads such that a portion is circumjacent said first section of firehose, each of said fingers (22) having a tip (80) at a distal end thereof and a lip (81) positioned on an inwardly facing surface (85) of each of said fingers (22) near said tip (80).

2. The directional indicator of claim 1 wherein,
said lip (81) is arranged and designed to contact said male coupler (30) when said directional indicator (10) is being removed from said male coupler (30).

3. The directional indicator of claim 1 wherein,
each of said fingers (22) is arranged and designed to slope inwardly toward each other near said tip (80).

4. The directional indicator of claim 1 further comprising,
a recess (88) disposed on said second obverse face of said annular body which accommodates said annular shoulder of said female coupler.

5. The directional indicator of claim 1 wherein,
each of said fingers (22) has a generally irregular pentagon shape defined by a first curved base edge (90) defined by a portion of said annular body (20) at said first face (76), second (92) and third (94) side edges each being generally perpendicular to said base edge (90) and connected thereto, and fourth (98) and fifth (96) edges, connected to said second (92) and third (94) edges, respectively, and generally forming said tip (80) having an arrowhead shape pointing in a direction towards said first section (50) of firehose, said second (92) and third (94) side edges each arranged and designed for contact with a portion of one of said two lugs (34).

6. The directional indicator of claim 1 further comprising,
a plurality of tactile indicia (82) each generally having a shape of an arrowhead and disposed on an outward facing surface (86) of one of said plurality of fingers.

7. A directional indicator (10) for a firehose coupling system, the coupling system including a male coupler (30) with male threads (32) secured to a first section (50) of firehose, said male coupler having a generally cylindrical body with an annular shoulder (33) from which said male threads (32) extend outwardly and a plurality of raised longitudinal lugs (34) which define interposed coupler surfaces (104) between said lugs on said cylindrical body, said system including a female coupler (36) with female threads (31) secured to a second section (60) of firehose, said female coupler having a generally cylindrical body with an annular shoulder (38) from which said female threads extend inwardly, said female threads arranged and designed for securement to said male threads of said male coupler, the directional indicator (10) comprising, a generally planar annular body (20) defining a plane and having a first face (76) which is arranged and designed to abut said annular shoulder (33) of said male coupler (30) and a second obverse face (78) which is arranged and designed to abut said annular shoulder (38) of said female coupler, and a plurality of curved fingers (22) which are integral with said annular body with each of said fingers (22) extending from said first face generally perpendicular to said plane of said annular body, each of said fingers (22) being arranged and designed for interjacent placement between two lugs (34) of said male coupler (30) circumjacent one of said interposed coupler surfaces (104) and extending longitudinally along said generally cylindrical body of said male coupler in a direction opposite the male threads and toward a tip (80) such that a portion is circumjacent said first section of firehose, each of said fingers (22) being arranged and designed to slope inwardly toward each other near said tip (80).

8. The directional indicator of claim 7 further comprising,
a lip (81) positioned on an inwardly facing surface (85) of each of said fingers (22) near said tip (80) which is arranged and designed to contact said male coupler (30) when said directional indicator is being removed from said male coupler (30).

9. The directional indicator of claim 8 wherein,
said lip (81) is arranged and designed to hinder removal of said directional indicator when said lip contacts said male coupler (30) thereby preventing inadvertent removal of said directional indicator from said firehose coupling system.

10. The directional indicator of claim 7 further comprising,
a recess (88) disposed on said second obverse face of said annular body which accommodates said annular shoulder of said female coupler.

11. The directional indicator of claim 7 wherein,
each of said fingers (22) has a generally irregular pentagon shape defined by a first curved base edge (90) defined by a portion of said annular body (20) at said first face (76), second (92) and third (94) side edges each being generally perpendicular to said base edge (90) and connected thereto, and fourth (98) and fifth (96) edges, connected to said second (92) and third (94) edges, respectively, and generally forming said tip (80) having an arrowhead shape pointing in a direction towards said first section (50) of firehose, said second (92) and third (94) side edges each arranged and designed for contact with a portion of one of said two lugs (34).

12. The directional indicator of claim 7 further comprising,
a plurality of tactile indicia (82) each generally having a shape of an arrowhead and disposed on an outward facing surface (86) of one of said plurality of fingers.

13. A directional indicator (10) for a firehose coupling system, the coupling system including a male coupler (30) with male threads (32) secured to a first section (50) of firehose, said male coupler having a generally cylindrical body with an annular shoulder (33) from which said male threads (32) extend outwardly and a plurality of raised longitudinal lugs (34) which define interposal coupler surfaces (104) between said lugs on said cylindrical body, said system including a female coupler (36) with female threads (31) secured to a second section (60) of firehose, said female coupler having a generally cylindrical body with an annular shoulder (38) from which said female threads extend inwardly, said female threads arranged and designed for securement to said male threads of said male coupler, the directional indicator (10) comprising, a generally planar annular body (20) defining a plane and having a first face (76) which is arranged and designed to abut said annular shoulder (33) of said male coupler (30) and a second obverse face (78) which is arranged and designed to abut said annular shoulder (38) of said female coupler, and a plurality of curved fingers (22) which are integral with said annular body with each of said fingers (22) extending from said first face at an acute angular slope to said plane of said annular body toward each other, each of said fingers (22) being arranged and designed for interjacent placement between two lugs (34) of said male coupler (30) circumjacent one of said interposal coupler surfaces (104) and extending longitudinally along said generally cylindrical body of said male coupler in a direction opposite the male threads such that a portion is circumjacent said first section of firehose, each of said fingers (22) having a tip (80) at a distal end thereof.

14. The directional indicator of claim 13 further comprising, a lip (81) positioned on an inwardly facing surface (85) of each of said fingers (22) near said tip (80) which is arranged and designed to contact said male coupler (30) when said directional indicator is being removed from said male coupler (30).

15. The directional indicator of claim 14 wherein, said lip (81) is arranged and designed to hinder removal of said directional indicator when said lip contacts said male coupler (30) thereby preventing inadvertent removal of said directional indicator from said firehose coupling system.

16. The directional indicator of claim 14 wherein, each of said fingers (22) is arranged and designed to slope inwardly toward each other near said tip (80).

17. The directional indicator of claim 13 wherein, each of said fingers (22) is arranged and designed to slope inwardly toward each other near said tip (80).

18. The directional indicator of claim 13 further comprising, a recess (88) disposed on said second obverse face of said annular body which accommodates said annular shoulder of said female coupler.

19. The directional indicator of claim 13 wherein, each of said fingers (22) has a generally irregular pentagon shape defined by a first curved base edge (90) defined by a portion of said annular body (20) at said first face (76), second (92) and third (94) side edges each being generally perpendicular to said base edge (90) and connected thereto, and fourth (98) and fifth (96) edges, connected to said second (92) and third (94) edges, respectively, and generally forming said tip (80) having an arrowhead shape pointing in a direction towards said first section (50) of firehose, said second (92) and third (94) side edges each arranged and designed for contact with a portion of one of said two lugs (34).

20. The directional indicator of claim 13 further comprising, a plurality of tactile indicia (82) each generally having a shape of an arrowhead and disposed on an outward facing surface (86) of one of said plurality of fingers.

* * * * *